United States Patent [19]
Suetsugu

[11] Patent Number: 6,074,127
[45] Date of Patent: Jun. 13, 2000

[54] RESIN DECKING

[75] Inventor: Katsuki Suetsugu, Osaka, Japan

[73] Assignee: Miyagawa Kasei Industry Co., Ltd., Osaka, Japan

[21] Appl. No.: 09/021,545

[22] Filed: Feb. 10, 1998

[30] Foreign Application Priority Data

Aug. 19, 1997 [JP] Japan .................................. 9-222362

[51] Int. Cl.[7] ...................................................... E01C 5/20
[52] U.S. Cl. ............................................. 404/36; 404/42
[58] Field of Search .............................. 404/17, 19, 25, 404/34, 35, 36, 43, 44, 42

[56] References Cited

U.S. PATENT DOCUMENTS

| | | | |
|---|---|---|---|
| 1,738,829 | 12/1929 | Jones | 404/43 X |
| 3,385,011 | 5/1968 | Sorrell | 404/25 X |
| 5,308,188 | 5/1994 | Shaftner | 404/25 |
| 5,364,204 | 11/1994 | MacLeod | 404/35 |
| 5,529,431 | 6/1996 | Walsh | 404/25 |
| 5,807,021 | 9/1998 | Aaron | 404/19 |

*Primary Examiner*—James A. Lisehora
*Attorney, Agent, or Firm*—W. F. Fasse; W. G. Fasse

[57] ABSTRACT

The top surface of a resin decking has an inclined plane which inclines downward from the center to the periphery. The height of the periphery of the top surface is uniform. Convex elongated portions or protrusions for guiding drainage are provided extending radially on the top surface. Drainage holes are provided near ends of the elongated protrusions. The decking allows efficient drainage on the top surface thereof.

9 Claims, 2 Drawing Sheets

RESIN DECKING

BACKGROUND OF THE INVENTION

1. Field of the Invention

The present invention relates to a structure of a resin decking which is placed on the ground of a construction site, for example, and can be used as a mat for vehicles passing thereon.

2. Description of the Background Art

It is known to use a resin decking as a temporary path for vehicles on a construction site, for example, whereby the resin decking is placed on the unlevel ground. By using such a decking, vehicles can be operated smoothly on the ground which is not sufficiently leveled. Thus, smooth and safe construction work is allowed.

However, since a conventional decking has a flat top surface, poor drainage of the top surface is observed when it is raining. Therefore, a puddle is formed on the top surface of the decking, and vehicles passing thereon tend to slip on the decking. As a result, lowered workability and safety have been a great concern.

SUMMARY OF THE INVENTION

The present invention aims to solve the problems described above. An object of the present invention is to provide a decking which can improve drainage on the top surface of the decking.

A resin decking according to the present invention is placed on the ground of a construction site, for example. The height of the periphery from the bottom surface to the top surface of the decking is uniform. The top surface of the decking has an inclined plane which inclines downward from the center to the periphery of the top surface.

As described above, the top surface of the decking according to the present invention has an inclined plane which inclines downward from the center to the periphery of the top surface, and the height of the periphery of the top surface is uniform. Therefore, water can flow uniformly from the center to the periphery of the decking top surface. In short, water on the top surface of the decking can flow almost uniformly to the periphery of the top surface. As a result, efficient drainage on the decking top surface is ensured. Further, since the height of the periphery of the decking top surface is uniform, the degree of freedom for coupling deckings so that their side surfaces are placed face-to-face is improved as compared with a case in which the height of the periphery is not uniform. Further, by using resin, the decking can be made hollow while its strength is maintained. Specifically, by selectively providing a rib on the back surface of the decking as shown in FIG. 4 of the present application, for example, a desired strength and lighter weight can be achieved. Thus, transportation, installation and the like of the decking are facilitated.

Preferably, the inclined plane is provided with convex portions or protrusions for drainage which extend preferably respectively along radial lines from the center to the periphery.

By providing such convex portions, water can flow efficiently along the convex portions from the center to the periphery of the decking top surface. In short, the convex portions function as a guide for drainage, and a good drainage effect is obtained. Particularly, by providing such convex portions almost uniformly over the entire top surface, drainage on the decking top surface can be more efficient. Further, by providing such convex portions, the tires of a vehicle can effectively be prevented from slipping on the decking when the decking is used as a temporary path for vehicles, for example. Therefore, workability and safety in rainy weather can further be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
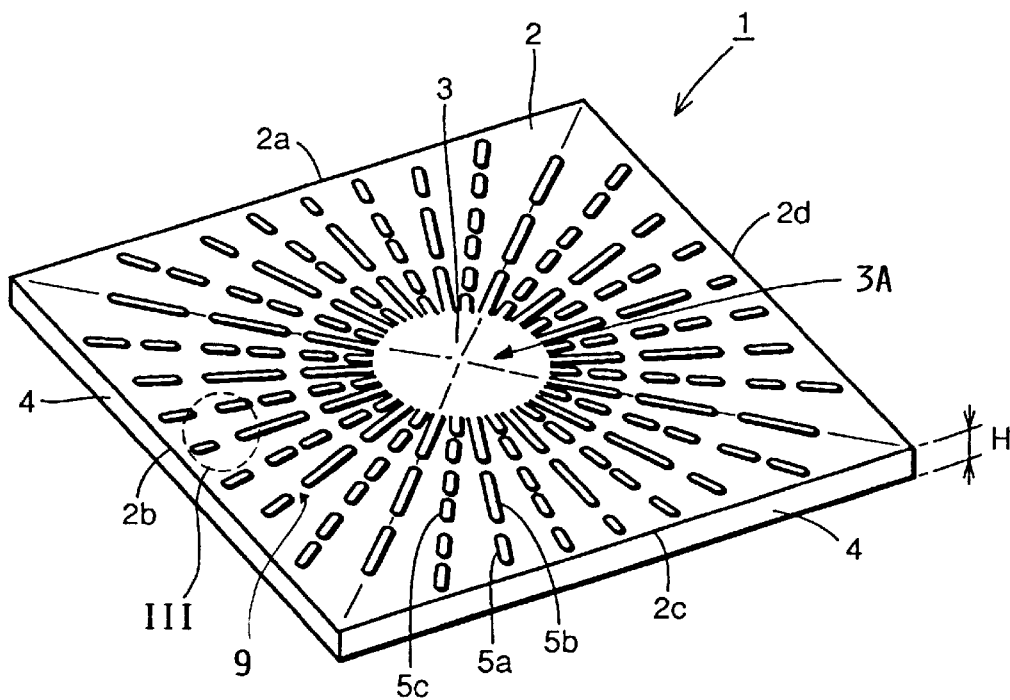
FIG. 1 is a perspective view showing a decking according to one embodiment of the present invention.

A resin decking according to the present invention will be described in detail below with reference to FIGS. 1–4. FIG. 1 is a perspective view showing an example of the resin decking according to the present invention.

Referring to FIG. 1, a decking 1 which is formed of resin such as polypropylene has a top surface 2 and a side surface 4. The periphery of top surface 2 is defined by four sides 2a, 2b, 2c, 2d which have the same length, and the center 3 of the top surface is set to be higher than the periphery of the top surface. More specifically, top surface 2 has an almost regular pyramid shape made up of four triangular planar surface portions meeting at a pyramid vertex in the example shown in FIG. 1. Since top surface 2 has such a shape, water on top surface 2 can efficiently be drained in rainy weather, and, unlike the conventional example, formation of a puddle on top surface 2 can effectively be prevented. As a result, when decking 1 is used as a temporary path for vehicles on a construction site, for example, the vehicles can be prevented from slipping on decking 1 even in rainy weather.

As shown in FIG. 1, top surface 2 is provided with a large number of convex portions or elongated oval protrusions 5a, 5b, 5c which extend radially from center 3 to the periphery of top surface 2 and which may respectively have elongated oval shapes of different sizes. Convex portions 5a–5c have a function as a guide for draining water from top surface 2 as well as a function for preventing slip of the tires of vehicles on top surface 2. By providing such convex portions 5a–5c, water can efficiently be drained from top surface 2, and slipping on top surface 2 can effectively be prevented.

Figure 3:
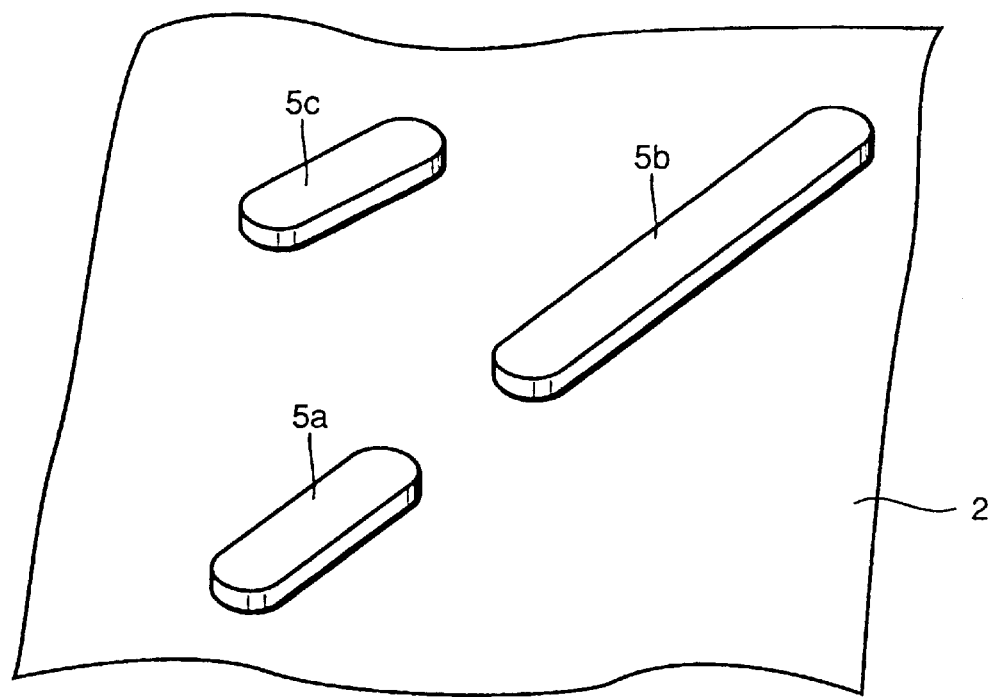
FIG. 3 is an enlarged view of a detail area III showing convex portions 5a–5c in FIG. 1.

The convex portions can be formed intermittently from center 3 to the periphery of top surface 2 as in the case of convex portions 5a, 5b shown in FIG. 1. In this case, as shown in FIGS. 1 and 3, convex portion 5c which is adjacent to convex portions 5a, 5b is preferably arranged out of alignment or staggered relative to convex portions 5a, 5b in the direction to the periphery of decking 1. Also, the convex portions may be omitted from a circular solid area 3A of the top surface around the center 3. By thus forming the convex portions intermittently and arranging adjacent convex portions out of alignment, lighter weight can be achieved while the slip prevention effect is maintained.

Further, through holes for drainage may be provided near the opposing ends along the longitudinal direction of convex portions 5a–5c as generally indicated by arrow 9 in FIG. 1. The drainage holes are omitted from FIG. 3. Thus, drainage on top surface 2 can be more efficient.

Figure 2:
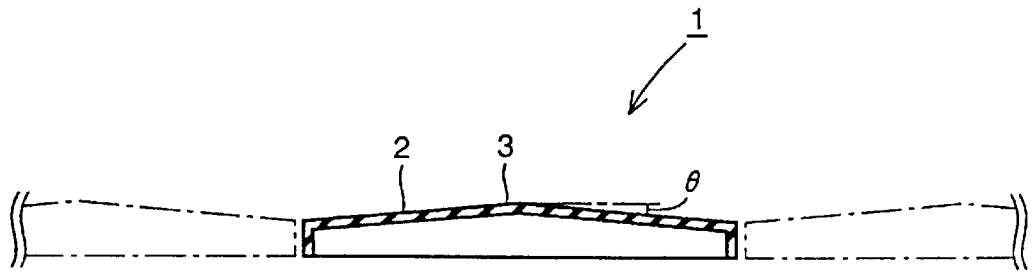
FIG. 2 is a sectional view of the decking shown in FIG. 1.

FIG. 2 is a sectional view of decking 1 shown in FIG. 1. As shown in FIG. 2, decking 1 is preferably of a hollow shape for lighter weight. As shown in FIG. 2, top surface 2 has an inclined plane which inclines by an angle θ with respect to the horizontal direction. More specifically, top surface 2 has an inclined plane which inclines downward by angle θ from center 3 to the periphery. Although the value θ can be set randomly, it is preferably of a few degrees.

Figure 4:
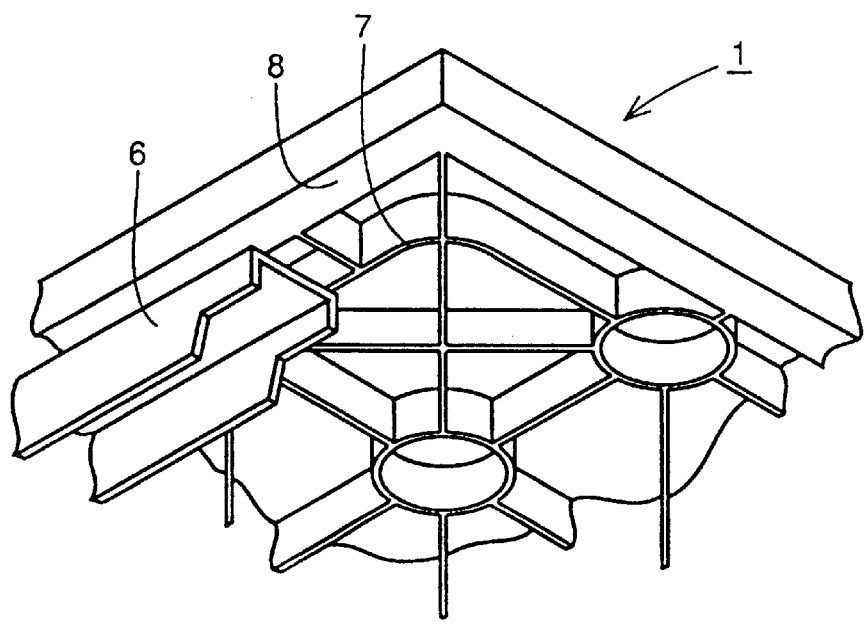
FIG. 4 is a perspective view showing a support member attached on the back surface of the decking according to the present invention.

Further, a rib, shown in FIG. 4, for enhancing the strength of decking 1 is provided on the back surface of decking 1. The rib will be described later. As shown in FIG. 1, the height H of the periphery of top surface 2 is set to be almost uniform. Thus, water can flow uniformly from the center to the periphery of top surface 2, and water is drained efficiently. When a plurality of deckings 1 are arranged so that their side surfaces are placed face-to-face, the degree of freedom for combining deckings 1 is improved as compared with a case in which the height H of the periphery is not uniform. Therefore, installation of decking 1 is facilitated.

A characteristic of the back surface structure of decking 1 according to the present invention will be described next with reference to FIG. 4. As shown in FIG. 4, a rib 7 is selectively provided on the back surface of decking 1. Preferably, the bottom surface of rib 7 is almost coplanar with a bottom surface 8 of the periphery of decking 1. Therefore, a support member 6 can be attached to the back surface of decking 1 so that it is supported by both of bottom surface 8 of the periphery of decking 1 and rib 7.

By ensuring that the bottom surface of rib 7 is almost coplanar with bottom surface 8 of the periphery of decking 1, support member 6 can be attached not only under the periphery of decking 1 but under the center of decking 1 at the same height. Thus, a large number of support members 6 can be attached to the back surface of decking 1 at the same height, and the strength of decking 1 can substantially be increased. As a result, decking 1 can be used to be placed directly on, for example, a U-shaped groove without a supporting grid. Therefore, decking 1 can be used for wider purposes.

Preferably, support member 6 is formed of a metal member. Support member 6 may be attached in several ways. For example, support member 6 may be provided with a through hole, and a clip or the like may fix rib 7 and support member 6 through this through hole.

Although the present invention has been described with respect to the one embodiment as above, the shape of top surface 2 of decking 1 may be a pyramid shape other than a regular pyramid shape or a prismoid shape as far as the center of top surface 2 is higher than the periphery of top surface 2. Further, the arrangement of convex portions 5a–5c is not limited to the one shown in FIG. 1 but other various arrangements are possible. However, the convex portions should preferably be provided almost uniformly on top surface 2. The shapes of convex portions 5a–5c, rib 7 and support member 6 are not limited to the ones shown in FIGS. 3 and 4 and various modifications are possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A resin decking member suitable to be arranged on a ground surface, having a top surface and a bottom surface bounded by a quadrangular peripheral edge around a periphery thereof, wherein:

an edge height of said decking member between said bottom surface and said top surface at said peripheral edge is uniform around said periphery;

a center height of said decking member between said bottom surface and said top surface at a center of said top surface is greater than said edge height;

said top surface comprises four triangular planar surface portions that respectively slope downward from said center to said peripheral edge and that adjoin one another to form a pyramid shape;

said top surface further comprises a plurality of elongated protrusions that convexly protrude from said planar surface portions;

said elongated protrusions are each respectively elongated between two protrusion ends in an elongation direction which extends radially from said center to said peripheral edge, and said elongated protrusions are intermittently arranged between said center and said peripheral edge; and said top surface has drainage holes passing therethrough respectively at locations proximate to said protrusion ends of said elongated protrusions.

2. The resin decking member according to claim 1, wherein said quadrangular peripheral edge has a square plan shape, said four triangular planar surface portions all have the same triangular shape and dimensions as each other, and said pyramid shape formed by said four triangular planar surface portions is a regular pyramid shape formed entirely by said four triangular planar surface portions.

3. The resin decking member according to claim 2, wherein said four triangular planar surface portions all adjoin each other at a pyramid vertex at said center of said top surface.

4. The resin decking member according to claim 3 wherein said top surface includes an area including and surrounding said pyramid vertex at said center, which is a solid area formed by said adjoining four triangular surface portions and which is devoid of said elongated protrusions.

5. The resin decking member according to claim 1, wherein said elongated protrusions respectively have elongated oval plan shapes of different sizes.

6. The resin decking member according to claim 1, wherein said decking member consists of polypropylene.

7. The resin decking member according to claim 1, wherein said bottom surface comprises a strengthening rib and concave hollow areas.

8. The resin decking member according to claim 7, wherein said bottom surface further comprises a peripheral rim that extends continuously along said peripheral edge and has a thickness corresponding to said edge height, a bottom of said rib is coplanar with a bottom of said peripheral rim along a bottom plane, and no part of said decking member protrudes downwardly below said bottom plane.

9. A combination of the resin decking member according to claim 2, and a metal support rail that is removably connected to said decking member along said bottom plane.

* * * * *

UNITED STATES PATENT AND TRADEMARK OFFICE
CERTIFICATE OF CORRECTION

PATENT NO. : 6,074,127
DATED : June 13, 2000
INVENTOR(S) : Suetsugu

It is certified that error appears in the above-indentified patent and that said Letters Patent is hereby corrected as shown below:

Col. 4, line 63, after "claim", replace "2" by --8--.

Signed and Sealed this

Third Day of April, 2001

Attest:

NICHOLAS P. GODICI

Attesting Officer     Acting Director of the United States Patent and Trademark Office